(12) United States Patent
Wang

(10) Patent No.: US 7,754,037 B2
(45) Date of Patent: Jul. 13, 2010

(54) MANUFACTURING METHOD FOR A SEAMLESS HAT

(76) Inventor: Tai-Kuang Wang, 18F, 216, Sec. 2, Tunhwa S. Rd., Taipei (TW)

( * ) Notice: Subject to any disclaimer, the term of this patent is extended or adjusted under 35 U.S.C. 154(b) by 1030 days.

(21) Appl. No.: 11/335,642

(22) Filed: Jan. 20, 2006

(65) Prior Publication Data

US 2007/0169873 A1    Jul. 26, 2007

(51) Int. Cl.
*B32B 37/00*    (2006.01)
(52) U.S. Cl. .................... 156/73.1; 156/267; 156/272.2
(58) Field of Classification Search ................ 156/73.1, 156/73.4, 157, 272.2, 227, 267
See application file for complete search history.

(56) References Cited

U.S. PATENT DOCUMENTS 7,005,021 B2 *    2/2006    Kramer ..................... 156/73.4

2004/0019954 A1 *    2/2004    Park ........................... 2/195.1

* cited by examiner

*Primary Examiner*—James Sells
(74) *Attorney, Agent, or Firm*—Leong C. Lei

(57) ABSTRACT

A manufacturing method for a seamless hat that uses cloth material having a chemical fiber component, which is cut to form cut-out pieces having specific pattern outlines, then, after affixing superimposed edges of the stitched cut-out pieces, supersonic or high frequency equipment is used to administer heat processing on the fixedly joined edges of the cut-out pieces. Thereupon, any surplus material from the stitched cut-out pieces can be cut away, only leaving the very minimum of connecting gathered edges. Then, heating art is implemented to externally apply and cover the joined areas of the gathered edges with hold-down strips containing thermosol or thermal polyurethane (TPU) membrane, thereby fabricating a hat.

1 Claim, 3 Drawing Sheets

MANUFACTURING METHOD FOR A SEAMLESS HAT

BACKGROUND OF THE INVENTION (a) Field of the Invention

The present invention relates to a manufacturing method for a seamless hat that avoids using stitches to stitch a hat during the machining process, whereby the heat fusing property of supersonic and high frequency wave processing is adopted to fuse fiber cloth material of a hat body of the hat to join together edges of the hat, then heating art is implemented to cover gathered edges of the joined areas with hold-down strips containing thermosol or thermal polyurethane (TPU) membranes, thereby completing fabrication of a wind and rainproof hat.

(b) Description of the Prior Art

A hat is a common piece of clothing worn when venturing outdoors, and style of the manufactured hat provides an aesthetic visual effect that a wearer attaches great importance to. Hence, different styled hats are selected and worn to match different fashion clothing according to different occasions and circumstances. Consequently, varied styles of hats continue to be designed and produced.

Moreover, because of the requirement to form a three-dimensional styled hat body, thus, a plurality of cut-out prices must be separately stitched together to form a canopy shape. When carrying out conventional needle stitching, the cut-out pieces are first fixedly stitched together; then, hold-down strips are stitched on to cover edges, thereby avoiding the annoyance of uneven edges of the cloth material. During the stitching operation, the needle carrying thread perforates the top surface of the cloth material and connects with an underside thread to achieve execution of a stitch structure. However, wind and water easily permeate holes produced by the needle, hence; there is a need to improve the design and manufacture of a hat having wind and rainproof functionality that overcomes the problem of a needle puncturing holes in the cut-out pieces.

In light of the aforementioned, the present invention provides a new hat manufacturing process and method that avoids using a conventional stitch machining method to manufacture a hat and increases efficiency in the hat manufacturing process. Moreover, the present invention reduces cost of manufacture to achieve producing an economical wind and rainproof hat for use by the general consumer.

SUMMARY OF THE INVENTION

The primary objective of the present invention is to provide a manufacturing method for a seamless hat that enables fabricating a hat with an outward appearance free from stitches, and provides the hat with original aesthetic visual appeal.

Another objective of the present invention is to provide the manufacturing method for a seamless hat that enables fabricating a hat free of stitches and the holes produced therefrom, and thus with waterproof functionality.

Yet another objective of the present invention is to provide the manufacturing method for a seamless hat that significantly reduces cost of manufacture, thereby increasing competitiveness by being able to be sold at a relatively lower selling price.

In order to achieve the aforementioned objectives, the present invention uses cloth material having a chemical fiber component that is cut to form cut-out pieces having appropriate pattern outlines, then, after affixing superimposed edges of the stitched cut-out pieces, supersonic or high frequency equipment is used to administer heat processing on the fixedly joined edges of the cut-out pieces. Thereupon, any surplus material from the stitched cut-out pieces can be cut away, only leaving the very minimum of connecting gathered edges. Then, heating art is implemented to externally apply and cover the joined areas of the gathered edges with hold-down strips containing thermosol or thermal polyurethane (TPU) membrane, thereby fabricating a hat.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 2:
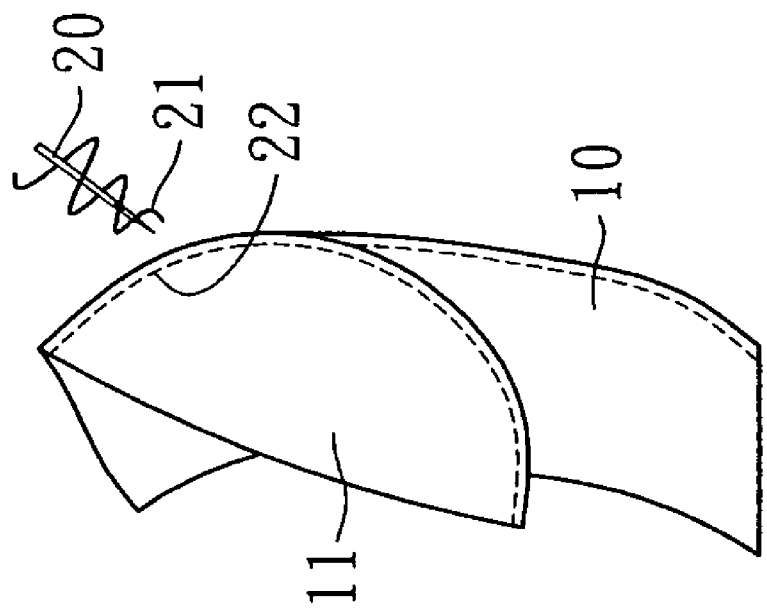
FIG. 2 shows a schematic view depicting the hat manufacture processing step involving fixing the cut-out pieces according to the present invention.
Figure 1:
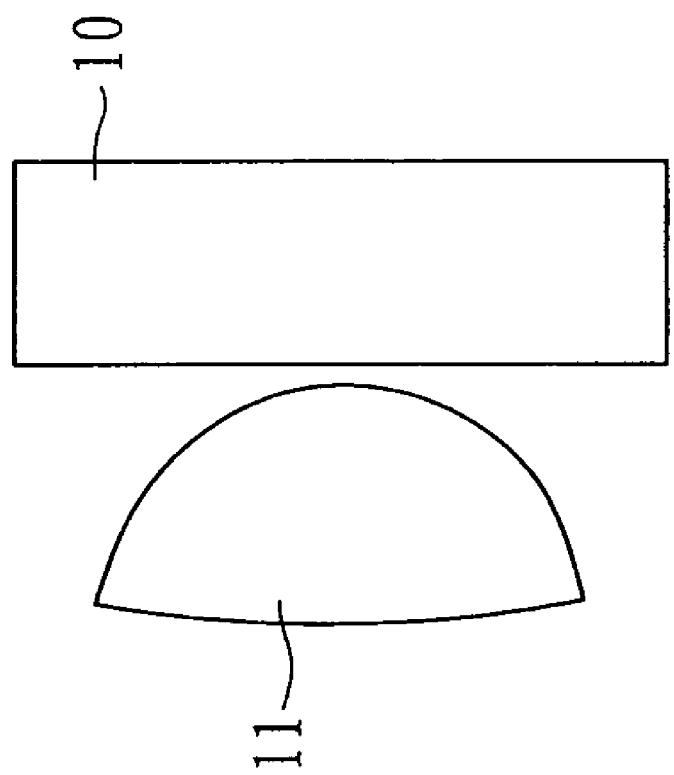
FIG. 1 shows a schematic view depicting a hat manufacture processing step involving arranging cut-out pieces according to the present invention.
Figure 4:
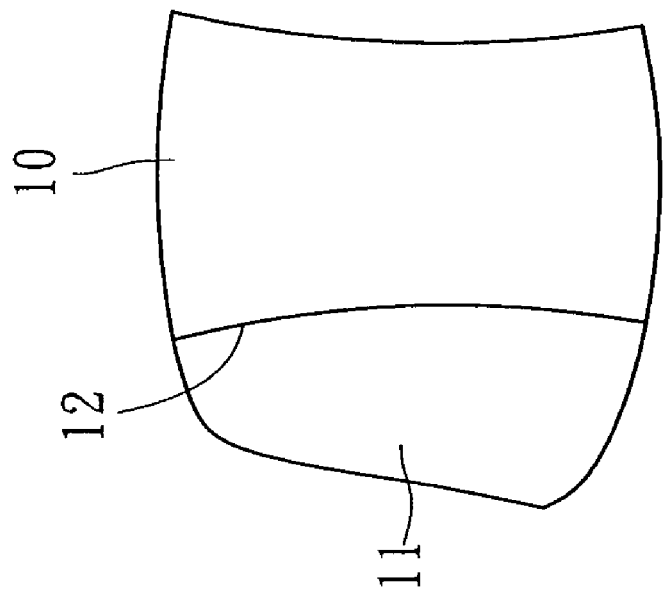
FIG. 4 shows a schematic view depicting the hat manufacture processing step after joining together the cut-out pieces according to the present invention.
Figure 3:
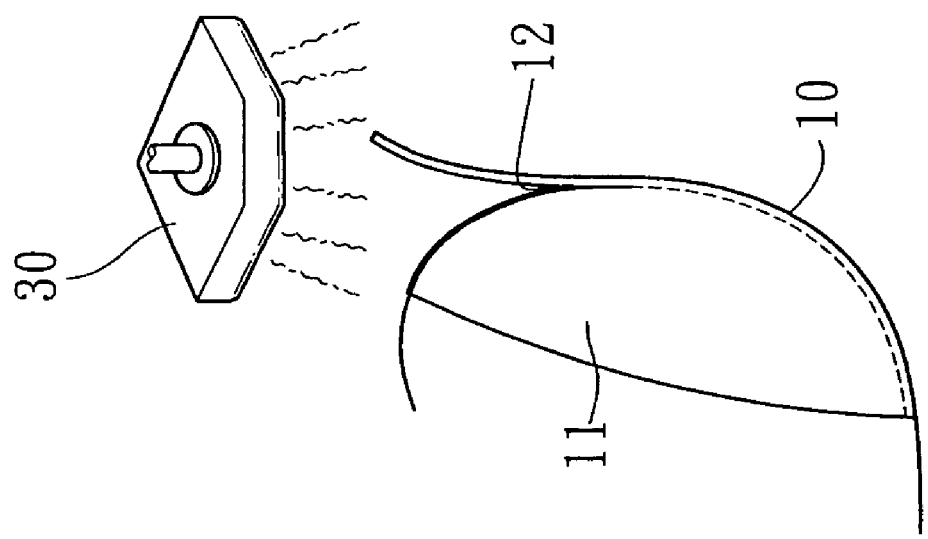
FIG. 3 shows a schematic view depicting the hat manufacture processing step involving heat fusing and joining the cut-out pieces according to the present invention.

Referring to FIGS. 1 to 6, during the manufacturing process of a seamless hat of the present invention, cloth material having a chemical fiber component is first chosen, and edges of cut-out pieces 10, 11 to be processed, precut to form specific pattern outlines (see FIG. 1), are superimposed. Then, a preliminary simple affixing of the edges of the cut-out pieces 10, 11 to be processed is carried out using a needle 20 and a thread 21, thereby establishing primary stitch points 22 on a joined edge area (see FIG. 2), whereupon supersonic or high frequency equipment 30 is used to administer heat processing on the fixedly joined edges of the cut-out pieces (10, 11), whereby the heat from the supersonic or high frequency equipment 30 fuses the fiber material component, thus joining together a gathered edge 12 of the superimposed stitched cut-out pieces 10, 11 (see FIG. 3). After fuse joining together each of the edges of the stitched cut-out pieces 10, 11 using the aforementioned heating process, then any surplus material from the stitched cut-out pieces 10, 11 can be cut away. A three-dimensional hat shape is thus formed using such art, and after everting the gathered edges 12 of the seamed areas of the hat body, the everted side serves as an outer layer of the hat forming a relatively soft and smooth surface (see FIG. 4), which differs from a visual effect showing needle holes resulting from stitching together of cut-out pieces. Then, heating art of supersonic or high frequency processing is similarly implemented to externally apply and cover the joined areas of the gathered edges 12 with hold-down strips 13 containing thermosol or thermal polyurethane (TPU) membrane, thereby fabricating the hat body of the hat (see FIG. 5).

Figure 6:
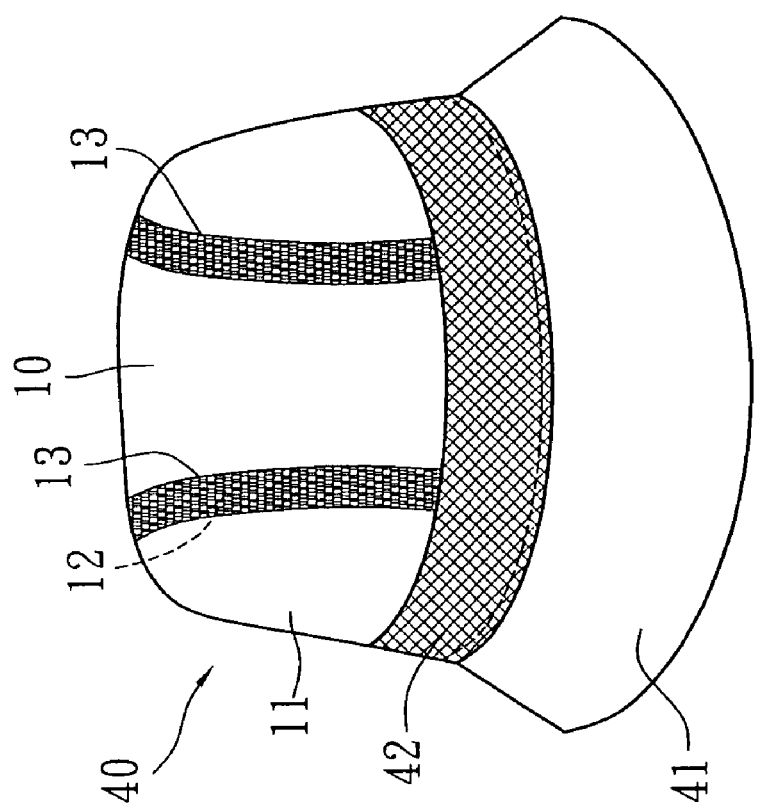
FIG. 6 shows a schematic view depicting outward appearance of the completed manufactured hat according to the present invention.
Figure 5:
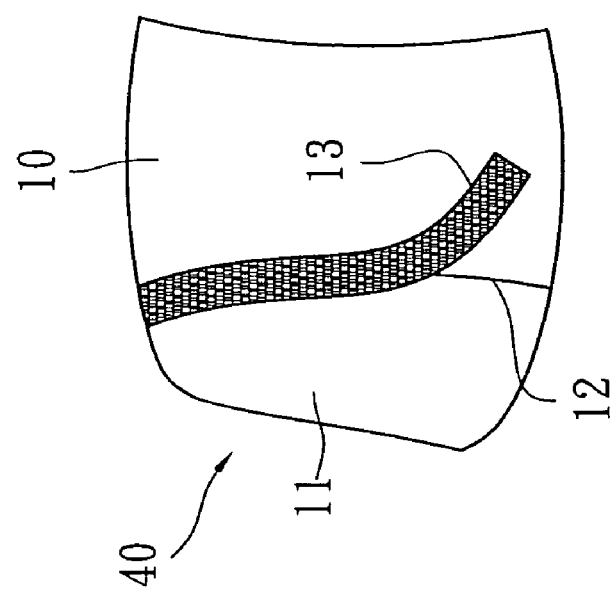
FIG. 5 shows a schematic view depicting the hat manufacture processing step involving covering joined edges with hold-down strips according to the present invention.

Referring to FIG. 6, which shows a fisherman cap as an embodiment of the present invention, wherein the external form of the hat includes not only a hat body 40, but also comprises a hat brim 41 and a surrounding decorative band 42. After completing the hat body 40, a bottom edge of the hat body 40 is similarly fuse joined or stitched to the hat brim 41, and then the decorative band 42 is stitched or firmly tied round the hat body 40, thereby completing fabrication of the hat.

In conclusion, the present invention discloses a manufacturing method for a seamless hat that provides the hat body 40 of a manufactured hat with an outward appearance free from stitches, and has wind and rainproof functionality. Moreover, the entire machining process accelerates production and reduces cost of manufacture. Moreover, the present invention is provided with originality and commercial utility value. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A manufacturing method for a seamless hat comprising steps of:
   a. selecting cloth material having a chemical fiber component, and cutting out cut-out pieces with specific pattern outlines;
   b. superimposing join edges of each of the cut-out pieces, and carrying out preliminary joining of the edges;
   c. using supersonic or high frequency processing art to administer heat processing on the edges of the superimposed cut-out pieces, thereby fusing the chemical fiber component and joining the edges;
   d. cutting away surplus cloth material from the cut-out pieces along joined gathered edges;
   e. everting the joined gathered edges to provide an everted side which serves as an outer layer of a hat body;
   f. implementing heating art to cover the joined gathered edges with hold-down strips containing thermosol or thermal polyurethane (TPU) membrane, thereby fabricating the hat body; and
   g. heat fusing a bottom edge of the hat body to a hat brim.

* * * * *